United States Patent [19]

Ashikawa et al.

[11] Patent Number: 5,031,064
[45] Date of Patent: Jul. 9, 1991

[54] MAGNETIC HEAD HAVING A SLIDER MEMBER CHARACTERIZED BY IMPROVED WEAR RESISTANCE

[75] Inventors: Masataka Ashikawa; Shuji Ogasawara; Masahiko Miura, all of Miyagi, Japan

[73] Assignee: Tokin Corporation, Taihaku, Japan

[21] Appl. No.: 407,543

[22] Filed: Sep. 15, 1989

[30] Foreign Application Priority Data

Sep. 17, 1988 [JP] Japan .................................. 63-231490
Aug. 25, 1989 [JP] Japan .................................. 1-217514

[51] Int. Cl.$^5$ ............................................. G11B 5/187
[52] U.S. Cl. ..................................... 360/122; 360/110; 360/125
[58] Field of Search ........................ 360/122, 110, 125

[56] References Cited

U.S. PATENT DOCUMENTS

| | | | |
|---|---|---|---|
| 4,598,052 | 7/1986 | Wada et al. | 360/122 X |
| 4,649,448 | 3/1987 | Nakajima et al. | 360/122 |
| 4,660,114 | 4/1987 | Yamakawa et al. | 360/122 |
| 4,681,813 | 7/1987 | Yamada et al. | 360/122 X |
| 4,734,802 | 3/1988 | Higuchi et al. | 360/122 X |
| 4,858,043 | 8/1989 | Kadokura et al. | 360/122 X |

Primary Examiner—John H. Wolff
Attorney, Agent, or Firm—Hopgood, Calimafde, Kalil, Blaustein & Judlowe

[57] ABSTRACT

In a magnetic head for use in recording and/or reproducing information for a magnetic recording medium, the magnetic head comprising a magnetic core and a non-magnetic slider member, the slider member having a principal surface to face the magnetic recording medium when information recording and/or reproducing are effected for the magnetic recording medium, the non-magnetic slider member is made of a ceramic material essentially consisting of $ZrO_2$ in order to improve durability and wear-resistance. The ceramic material can contain 27–70% $Al_2O_3$ on a base of weight ratio while the balance is substantially $ZrO_2$. The $ZrO_2$ can be partially replaced by at least one selected from a group of $Y_2O_3$, CaO, and MgO, within a range of 2–17% on a base of molecular ratio.

9 Claims, 2 Drawing Sheets

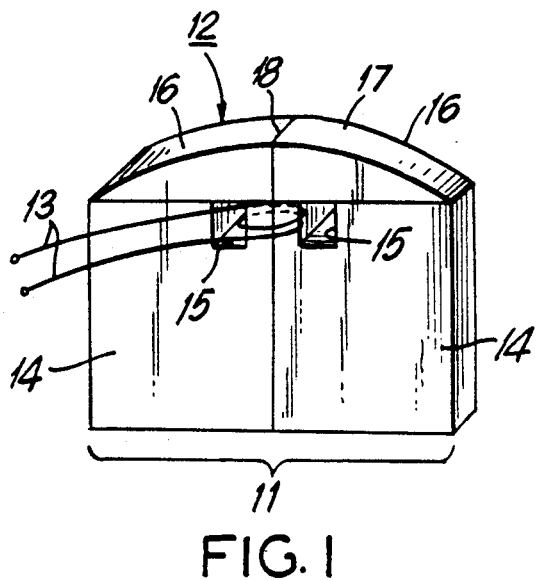 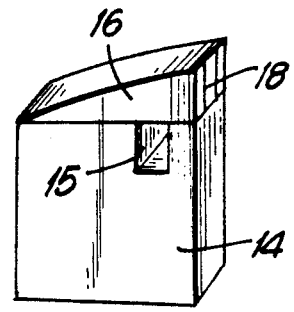
FIG. 1    FIG. 2
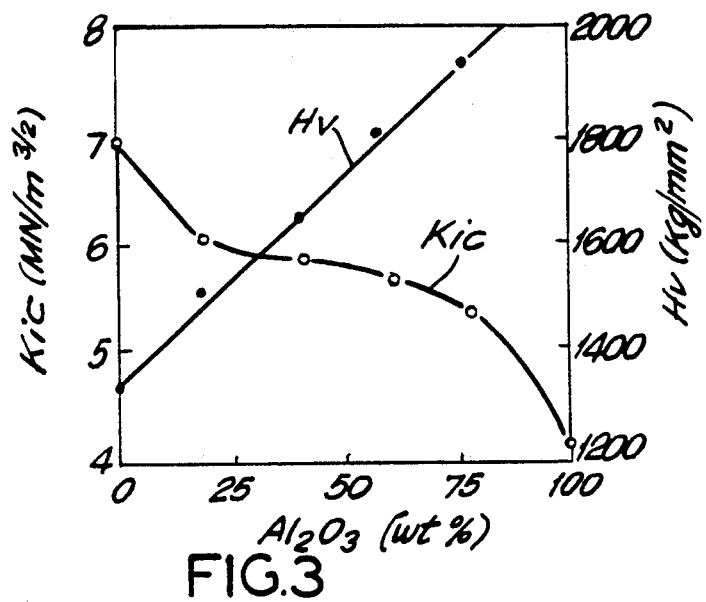 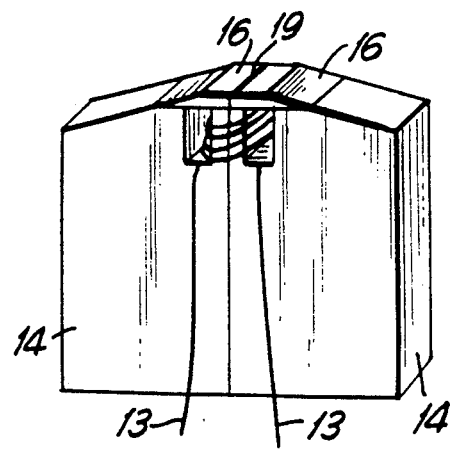
FIG. 3    FIG. 4
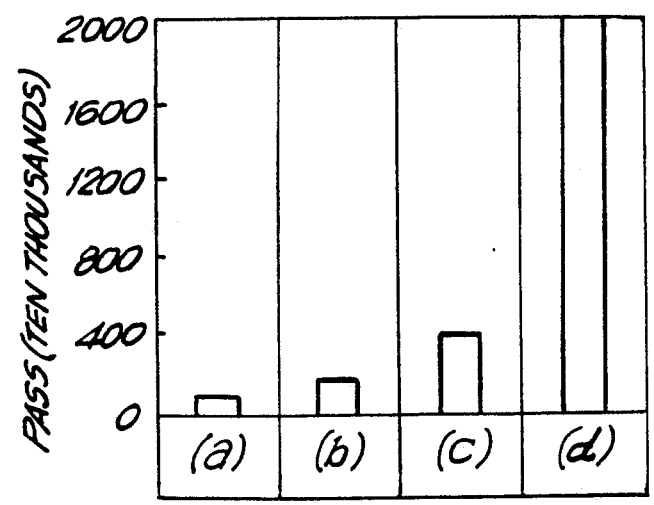
FIG. 5

MAGNETIC HEAD HAVING A SLIDER MEMBER CHARACTERIZED BY IMPROVED WEAR RESISTANCE

BACKGROUND OF THE INVENTION

The present invention relates to a magnetic head for use in information recording and/or reproducing for a magnetic recording medium such as a magnetic tape or a magnetic disk, and, in particular, to a magnetic head with a slider for use in a high density magnetic recording system.

Magnetic heads used for a floppy disk driving apparatus, a video floppy driving apparatus, a hard disk driving apparatus, and others, are disposed to face the magnetic recording medium and have a non-magnetic block which has a principal surface facing the magnetic recording medium. The non-magnetic blocks are called sliders. For example, the magnetic head for the floppy disk driving apparatus comprises two non-magnetic sliders between which a head core is held with a magnetic gap exposed in the principal surface of the sliders. In the video floppy driving apparatus, thin film magnetic cores and coils are formed in a side surface of a non-magnetic slider while a magnetic gap is disposed in the principal surface of the slider. A magnetic head for the hard disk driving apparatus has a slider for generating a lifting force of the head. A single magnetic pole magnetic head of a main magnetic pole exciting type for a perpendicular magnetic recording system comprises sliders holding the main magnetic pole therebetween.

The slider protects the magnetic gap or the main magnetic pole as well as prevents the magnetic head and/or the magnetic recording medium from being partially subjected to a large stress so that a stable contacting condition is maintained between the magnetic head and the magnetic recording medium.

Conditions required for the slider are:
(1) good wear resistance;
(2) precise and easy working without chipping and cracking;
(3) non-porous and flat at its surface; and
(4) stable chemically.

Considering those conditions, it has been proposed that the slider be made of calcium titanate ($CaTiO_3$), barium titanate ($BaTiO_3$), non-magnetic ferrite ($ZnFe_2O_4$), crystallized glass, and others.

In order to improve a recording density in the magnetic recording medium, a metallic medium and a thin film medium have been developed. Those media have a high toughness.

On the other hand, it is required that the space between the magnetic head and the magnetic recording medium should be reduced in order to realize the high recording density. As a result, a contact pressure is increased between the principal surface of the magnetic head and the magnetic recording medium.

Therefore, there is a problem of providing good wear resistance for the magnetic head.

When the above-described magnetic heads with the proposed sliders are used for the improved media with the high toughness, the sliders are readily destroyed due to the contact pressure and/or contacting impact between the sliders and the media because the propsed sliders are not sufficient in hardness and toughness in comparison with those of the improved media.

SUMMARY OF THE INVENTION

Therefore, it is an object of the present invention to provide a magnetic head with a slider for use in a high density magnetic recording system which has an improved slider of optimum hardness, toughness, wear resistance and durability.

It is another object of the present invention to provide a slider material for a magnetic head which has excellent hardness, toughness and wear resistance.

The present invention is applicable to a magnetic head for use in recording and/or reproducing information for a magnetic recording medium, said magnetic head having a principal surface facing the magnetic recording medium during the recording and/or reproducing. A magnetic head according to the present invention comprises a surface layer including said principal surface and being made of a ceramic material consisting essential of $ZrO_2$.

The ceramic material has a martensitic structure and Vickers hardness of 1000 or more.

The ceramic material may preferably range from 30-73% $ZrO_2$ by weight and the balance substantially $Al_2O_3$ ratio.

The ceramic material may further comprise additives up to 0.01 wt %, said additives being $Fe_2O_3$, $Na_2O_3$ and $SiO_2$.

In the ceramic material, $ZrO_2$ may partially be replaced by at least one ceramic selected from group consisting of $Y_2O_3$, CaO, and MgO, the replaced amount being 2-17%.

According to the present invention, a magnetic head having a slider member is characterized in that the slider member is made of the above-mentioned ceramic material.

BRIEF DESCRIPTION OF THE DRAWINGS

FIG. 1 is a perspective view of a magnetic head according to a first embodiment of the present invention;

FIG. 2 is a perspective view of a half part of the magnetic head shown in FIG. 1, but a coil being removed;

FIG. 3 is a view illustrating a graph representative of the mechanical properties of a slider member included in the magnetic head of FIG. 1;

FIG. 4 is a perspective view of a magnetic head according to a second embodiment of this invention;

FIG. 5 is a view illustrating a graph representative of a result of durability test of various magnetic heads;

DESCRIPTION OF THE PREFERRED EMBODIMENTS

Figure 6:
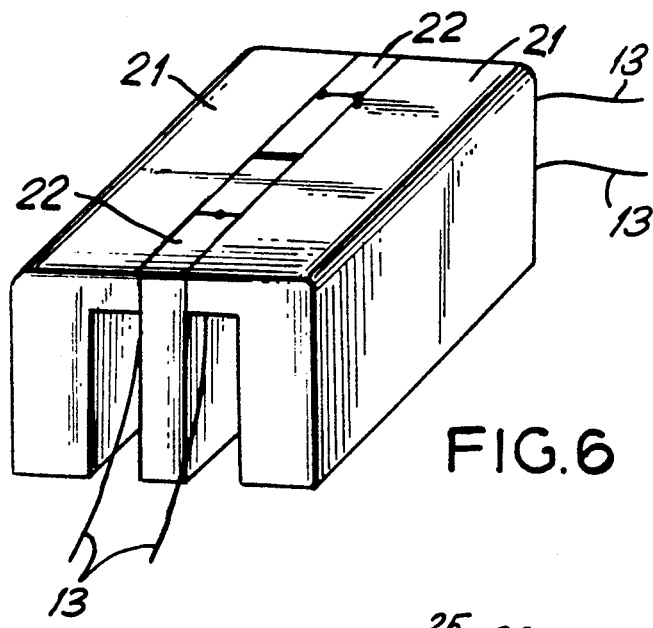
FIG. 6 is a perspective view of a magnetic head according to a third embodiment of the present invention.

Referring to FIG. 1, a magnetic head according to a first embodiment of the present invention comprises a core portion 11, a slider portion 12, and a coil 13 as will presently be described. The core portion 11 comprises two core members 14 which are adhered to each other by means of sealing glass or other adhering agents. Each of the core members 14 is made of Ni-Zn ferrite and has a groove 15 on an upper end thereof.

The slider portion 12 comprises two slider members 16 each being of a sintered material of a ceramic material which will later be described. Each of the slider members 16 is fixed to the upper end of each of the core members 14 by a joining member such as sealing glass and others. An upper surface 17 of the slider portion 12 will hereinafter be called a principal surface which faces a magnetic recording medium (not shown) when the recording and/or reproducing is carried out for the medium by the magnetic head.

As will be clear from FIG. 2, one of the slider members 16 is provided with a magnetic film 18 which is formed on a side end thereof by sputtering technique. The magnetic film 18 is connected to the core portion 11 to serve as a main magnetic pole of the magnetic head. The slider members 16 are adhered to each other through the magnetic film 18.

The coil 13 is provided to the core portion 11 to be placed in the grooves 15.

The sintered material is of an oxide having martensitic structure and consists, by weight, for example, of $ZrO_2$ 65.7%, $Y_2O_3$ 4.3%, and $Al_2O_3$ 30%. The above-mentioned sintered material has thermal expansion coefficient of $80-100 \times 10^{-7}/°$ C. and Vickers hardness of 1000 or more. The $Y_2O_3$ serves to make tetragonal crystals dispersed in a cubic crystal phase.

It is preferable that the slider members 16 have thermal expansion coefficient of $95 \times 10^{-7}/°$ C. and Vickers hardness of 1470 ($Kg/mm^2$) and that the core members 14 have thermal expansion coefficient of $97 \times 10^{-7}/°$ C. In this case, the thermal expansion coefficient of the slider members 16 approximates that of the core member 14. Therefore, cracking does not occur by thermal impact in the core and the slider members 14 and 16 joined to one another.

Referring to FIG. 4, a magnetic head according to a second embodiment of this invention comprises a main magnetic pole member 19 which is tightly held between the slider members 16. It is to be noted in this connection that the slider members 16 is relatively small to be placed only in a vicinity of the main magnetic pole member 19.

Description will be directed to an example of a manufacturing method of the slider members 16. In order to manufacture the slider members 16, starting powder mixtures were prepared from $ZrO_2$, $Y_2O_3$, and $Al_2O_2$. An amount of ($ZrO_2+Y_2O_3$) was varied in reverse proportion to that of $Al_2O_3$, while an amount of $Y_2O_3$ was adjusted to be 4 mol % for the amount of ($ZrO_2+Y_2O_3$). Each of those mixtures can have 0.01 wt % or less impurities or additives of $Fe_2O_3$, $Na_2O_3$, and/or $SiO_2$.

Then, each of the prepared mixtures was wet-mixed by a vibrating-type mill together with a solvent such as a methyl alcohol or the like, the mixture then dried to remove the solvent. As a result, a mixed powder was obtained.

The mixed powder was compacted under a pressure of 1 $t/cm^2$ into a compact of a predetermined shape, and then heated under a reduced pressure at a temperature of 1600° C. for one hour. After that, the compact was treated by a hot isosatic process under 1500 atmospheric pressure for one hour in argon gas. The treated compact has a density which is equal to or more than 99% of the theoretical density.

Mechanical properties, such as toughness Kic and the Vickers hardness Hv of the treated compact, were measured. The measured data are shown in FIG. 3.

As will be clearly understood from FIG. 3, the mechanical properties vary with increase of the $Al_2O_3$ content. With respect to the mechanical properties, it is preferred that the $Al_2O_3$ for the slider range from about 27-70 wt % of the starting mixture. Accordingly, it is preferred that the ($ZrO_2+Y_2O_3$) range from about 30-73 wt %. The treated compact was machined to produce slider members 16, and a durability test was carried out as to the magnetic head of FIG. 4 using the mechanical slider member.

Referring to FIG. 5, description will be made as to a result of the durability test. In FIG. 5, (a), (b), (c), and (d) are representative of various magnetic heads using slider members made of $ZnFe_2O_3$, $BaTiO_3$, crystal glass, and $Al_2O_3.ZrO_2$, respectively. The durability test was carried out in a video floppy driving device. In this event, a Co-Cr thin film magnetic recording medium was rotated 14 at 3,600 rpm and brought into pressing contact with each test magnetic head by a groove-shaped pad in the manner known in the art.

As will be clearly understood from FIG. 5, the slider of $Al_2O_3.ZrO_2$ has excellent durability in comparison with the others. This means the wear resistance is improved in the magnetic head shown in FIG. 4. The Vickers hardness and the toughness of the used conventional sliders are shown in Table-1 below and are lower than that for the $ZrO_2.Al_2O_3$ slider shown in FIG. 4.

TABLE 1

| characteristics | materials | | |
|---|---|---|---|
| | $ZnFe_2O_3$ | $BaTiO_3$ | crystal glass |
| Vickers hardness ($Kg/cm^2$) | 700 | 800 | 1000 |
| toughness (MI rule) $MN/m^{3/2}$ | 1.2 | 1.3 | 1.89 |

Figure 7:
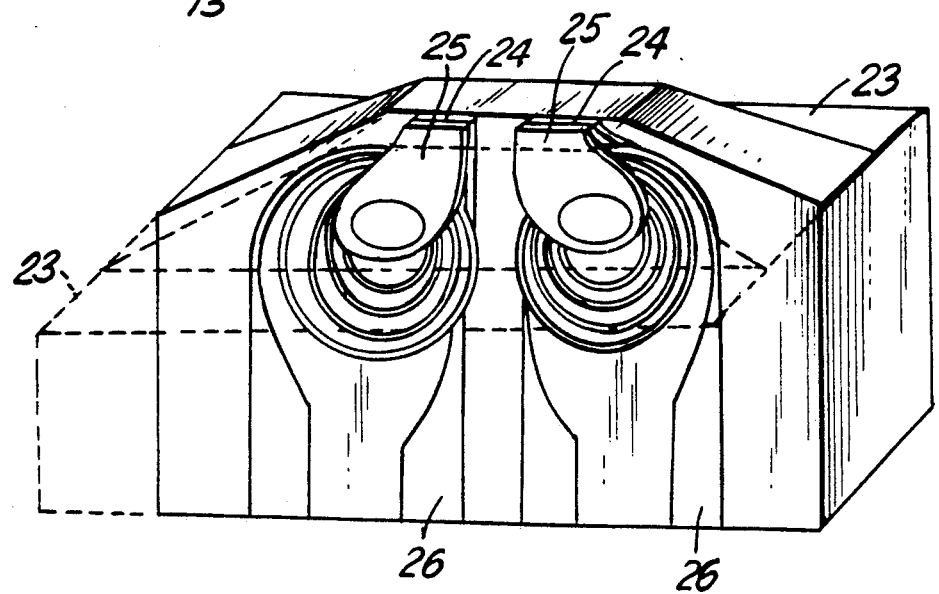
FIG. 7 is a perspective view of a magnetic head according to a fourth embodiment, with one of sliders removed.
Figure 8:
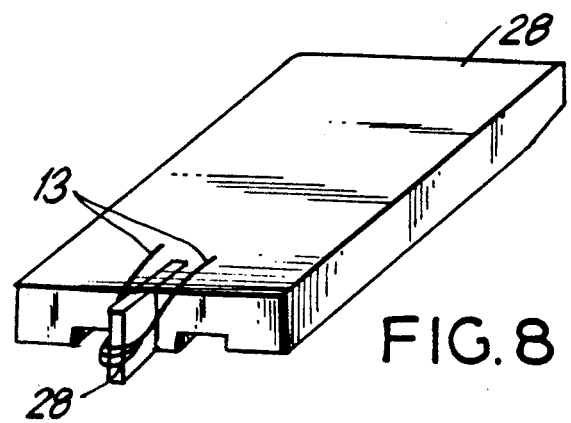
FIG. 8 is a perspective view of a magnetic head according to a fifth embodiment.

It is a matter of course that the invention is applicable to various magnetic heads, for example, the magnetic heads shown in FIGS. 6 to 8.

Referring to FIG. 6, a magnetic head according to the third embodiment of this invention is for use in a floppy disk driving apparatus. The magnetic head comprises two slider members 21 and magnetic cores 22 which are tightly held between the slider members 21.

Referring to FIG. 7, a magnetic head according to the fourth embodiment of this invention is for use in the video floppy driving apparatus. The magnetic head comprises slider members 23 each of which is made of non-magnetic plate. A predetermined one of the slider members 23 is provided, on a side surface thereof, with four magnetic cores 24 and 25 and two coils 26 between opposite ones of the magnetic cores 24 and 25. Each of magnetic cores 24 and 25 and coils 26 is formed by a thin film producing technique.

Referring to FIG. 8, a magnetic head according to the fifth embodiment of this invention is for use in a hard disk driving apparatus. The magnetic head comprises a slider member 27 in addition to a magnetic core 28 and a coil 29. The slider 28 is for producing a lifting force.

What is claimed is:

1. A magnetic head for use in recording on and/or reproducing information from a magnetic recording medium, said magnetic head having a principal surface which includes a slider member adapted to contact the magnetic recording medium during a recording and/or reproducing cycle, said slider member being made of a ceramic material comprising martensitic $ZrO_2$ having a hardness of at least about 1,000 Vickers.

2. The magnetic head as in claim 1, wherein said ceramic material of said slider member is comprised essentially by weight of about 30% to 73% $ZrO_2$ and the balance essentially $Al_2O_3$.

3. The magnetic head as in claim 2, wherein the $ZrO_2$ content is partially replaced by about 2 to 17 mol % of ceramic selected from the group consisting of $Y_2O_3$, CaO and MgO, and wherein the crystal structure thereof is characterized by a dispersion of tetragonal crystals in a cubic crystal phase.

4. A magnetic head for use in recording on and/or reproducing information from a magnetic recording medium, said magnetic head comprising a magnetic core and non-magnetic slider member fixed thereto, said slider member having a principal surface adapted to contact the magnetic recording medium during a recording and/or reproducing cycle, said non-magnetic slider member being made of a ceramic material comprised by weight of about 30% to 73% $ZrO_2$ and the balance essentially $Al_2O_3$, said material characterized by a martensitic structure and hardness of at least about 1,000 Vickers.

5. The magnetic head as in claim 4, wherein the $ZrO_2$ content is partially replaced by about 2 to 17 mol % of a ceramic selected from the group consisting $Y_2O_3$, CaO and MgO, and wherein the crystal structure is characterized by a dispersion of tetragonal crystals in a cubic crystal phase.

6. A non-magnetic slider material for use as a slider member in a magnetic head, said magnetic head being used for magnetic recording and/or reproducing, said slider material being made of a ceramic material comprising martensitic $ZrO_2$ having a hardness of at least about 1,000 Vickers.

7. The slider material as in claim 6, wherein said ceramic material consists essentially by weight of about 30 to 73% $ZrO_2$ and the balance essentially $Al_1O_3$, said ceramic material having a tetragonal crystal structure.

8. The slider material as in claim 7, wherein $ZrO_2$ is partially replaced by at least one ceramic material selected from the group consisting of $Y_2O_3$, CaO and MgO in an amount ranging from about 2 to 17 mol %, said slider material having a microstructure characterized by a dispersion of tetragonal crystals in a cubic phase.

9. A non-magnetic slider material for use as a slider member in a magnetic head as in claim 8, said slider member having a composition containing approximately by weight about 65.7% $ZrO_2$, about 4.3% $Y_2O_3$ and about 30% $Al_2O_3$, said composition having a thermal expansion coefficient of about 80 to $110 \times 10^{-7}/°C$., a Vickers hardness of at least about 1,000 and a martenistic microstructure.

* * * * *